(12) United States Patent
Kai (10) Patent No.: US 12,493,974 B2
(45) Date of Patent: Dec. 9, 2025

(54) INFORMATION PROCESSING APPARATUS, THREE-DIMENSIONAL POSITION ESTIMATION METHOD, AND A NON-TRANSITORY COMPUTER-READABLE MEDIUM

(71) Applicant: NEC Corporation, Tokyo (JP)

(72) Inventor: Natsuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 18/038,083

(22) PCT Filed: Nov. 30, 2020

(86) PCT No.: PCT/JP2020/044505
§ 371 (c)(1),
(2) Date: May 22, 2023

(87) PCT Pub. No.: WO2022/113344
PCT Pub. Date: Jun. 2, 2022

(65) Prior Publication Data
US 2024/0005548 A1    Jan. 4, 2024

(51) Int. Cl.
*G06T 7/50*    (2017.01)
*G06T 7/13*    (2017.01)
(Continued)

(52) U.S. Cl.
CPC ............... *G06T 7/70* (2017.01); *G06T 7/13* (2017.01); *G06T 7/50* (2017.01); *G06V 10/44* (2022.01);
(Continued)

(58) Field of Classification Search
None
See application file for complete search history.

(56) References Cited

U.S. PATENT DOCUMENTS 9,635,346 B2 *    4/2017    Iida ..................... G01S 17/894
2013/0101173 A1 *    4/2013    Holeva .................... G06T 7/13
382/104
(Continued)

FOREIGN PATENT DOCUMENTS

CN    109650292 A    4/2019
JP    2015-225450 A    12/2015
(Continued)

OTHER PUBLICATIONS

Xiao, J., Lu, H., Zhang, L., & Zhang, J. (2017). Pallet recognition and localization using an rgb-d camera. International Journal of Advanced Robotic Systems, 14(6), 1729881417737799. (Year: 2017).*
(Continued)

*Primary Examiner* — Ian L Lemieux
(74) *Attorney, Agent, or Firm* — Sughrue Mion, PLLC (57) ABSTRACT

An information processing apparatus (10) includes: a detection unit (11) configured to detect, using an image and forks for supporting the transport pallet are captured, a shape of fork insertion slots into which the forks are inserted and a shape of the forks; an acquisition unit (12) configured to acquire a depth image showing depth information of the fork insertion slots and depth information of the forks in the image; a correction unit (13) configured to correct, using the shape of the fork insertion slots and the shape of the forks that are detected, the depth information so that the shape of the fork insertion slots and the shape of the forks can be recognized in the depth image; and a position estimation unit (14) configured to estimate three-dimensional positions of the fork insertion slots and three-dimensional positions of the forks based on the depth information.

9 Claims, 8 Drawing Sheets

(51) Int. Cl.
*G06T 7/70* (2017.01)
*G06V 10/44* (2022.01)
*G06V 10/75* (2022.01)

(52) U.S. Cl.
CPC .. *G06V 10/751* (2022.01); *G06T 2207/10024* (2013.01); *G06T 2207/10028* (2013.01); *G06T 2207/30204* (2013.01)

(56) References Cited

U.S. PATENT DOCUMENTS

| | | | |
|---|---|---|---|
| 2015/0347840 A1 | 12/2015 | Iida | |
| 2017/0243372 A1 | 8/2017 | Iida et al. | |
| 2018/0089616 A1* | 3/2018 | Jacobus | G05D 1/0274 |
| 2018/0293743 A1 | 10/2018 | Iida et al. | |
| 2018/0304468 A1* | 10/2018 | Holz | B25J 9/1697 |
| 2019/0333012 A1* | 10/2019 | Jacobus | G06K 19/07758 |
| 2020/0002143 A1* | 1/2020 | Hasegawa | G05D 1/0246 |
| 2021/0207943 A1* | 7/2021 | Fujiwara | G06T 7/62 |
| 2021/0371260 A1* | 12/2021 | Chien | B66F 9/0755 |
| 2022/0067960 A1* | 3/2022 | Guo | G06T 7/62 |

FOREIGN PATENT DOCUMENTS

| | | |
|---|---|---|
| JP | 2017-151650 A | 8/2017 |
| JP | 2018-162122 A | 10/2018 |
| JP | 2018-179599 A | 11/2018 |
| JP | 2019-156641 A | 9/2019 |
| JP | 2019-199331 A | 11/2019 |

OTHER PUBLICATIONS

Pages, J., Armangué, X., Salvi, J., Freixenet, J., & Martí, J. (Jun. 2001). A computer vision system for autonomous forklift vehicles in industrial environments. In Proc. of the 9th Mediterranean Conference on Control and Automation MEDS (pp. 1-6). (Year: 2001).*

Y.-Y. Li et al., "Pallet detection and localization with RGB image and depth data using deep learning techniques," 2021 6th International Conference on Automation, Control and Robotics Engineering (CACRE), Dalian, China, 2021, pp. 306-310, doi: 10.1109/CACRE52464.2021.9501390. (Year: 2021).*

Olsson, E., Sundin, J. (2017). On visionsystems for pallet identification and positioning for autonomous warehouse vehicles (Dissertation). Retrieved from https://www.diva-portal.org/smash/get/diva2:1112982/FULLTEXT01.pdf (Year: 2017).*

Baglivo, L., Biasi, N., Biral, F., Bellomo, N., Bertolazzi, E., Da Lio, M., & De Cecco, M. (2011). Autonomous pallet localization and picking for industrial forklifts: a robust range and look method. Measurement Science and Technology, 22(8), 085502. (Year: 2011).*

Iinuma, R., Hori, Y., Onoyama, H., Fukao, T., & Kubo, Y. (Aug. 2021). Pallet detection and estimation for fork insertion with rgb-d camera. In 2021 IEEE International Conference on Mechatronics and Automation (ICMA) (pp. 854-859). IEEE. (Year: 2021).*

Zhang, Y., & Funkhouser, T. (2018). Deep Depth Completion of a Single RGB-D Image. In Proceedings of the IEEE conference on computer vision and pattern recognition (pp. 175-185). (Year: 2018).*

Zhao, J., Li, B., Wei, X., Lü, H., Lu, E., & Zhou, X. (2022). Recognition and Location Algorithm for Pallets in Warehouses Using RGB-D Sensor. Applied Sciences, 12(20), 10331. (Year: 2022).*

International Search Report for PCT Application No. PCT/JP2020/044505, mailed on Dec. 28, 2020.

* cited by examiner

INFORMATION PROCESSING APPARATUS, THREE-DIMENSIONAL POSITION ESTIMATION METHOD, AND A NON-TRANSITORY COMPUTER-READABLE MEDIUM

This application is a National Stage Entry of PCT/JP2020/044505 filed on Nov. 30, 2020, the contents of all of which are incorporated herein by reference, in their entirety.

TECHNICAL FIELD

The present disclosure relates to an information processing apparatus, a three-dimensional position estimation method, a program, and the like.

BACKGROUND ART

In recent years, with the aim of solving a labor shortage in the field of logistics, a technique of autonomously operating forklifts which eliminates the need for human operation has been studied. In the case of adopting autonomously operating forklifts in the field of logistics, it is necessary to operate a forklift so that the forks are inserted into fork insertion slots of a pallet accurately.

Patent Literature 1 discloses a configuration of a forklift equipped with a camera. The forklift disclosed in Patent Literature 1 takes an image of a transport pallet using the camera, and based on the taken image, detects the position of the transport pallet.

CITATION LIST

Patent Literature

Patent Literature 1: Japanese Unexamined Patent Application Publication No. 2018-162122

SUMMARY OF INVENTION

Technical Problem

In the detection system for detecting a position of a transport pallet disclosed in Patent Literature 1, it is necessary to properly mount a camera on the forklift. In other words, if the camera mounted on the forklift is tilted, the position of the transport pallet detected using the tilted camera may not be accurate, and thus there is a problem that the forks of the forklift cannot be accurately inserted into the fork insertion slots of the transport pallet.

An object of the present disclosure is to provide an information processing apparatus, a three-dimensional position estimation method, a program, and the like each adapted to have the forks of a forklift inserted into the fork insertion slots of a transport pallet accurately.

Solution to Problem

An information processing apparatus according to the present disclosure includes: a detection unit configured to detect, using an image in which a transport pallet and forks of a forklift for supporting the transport pallet are captured, a shape of fork insertion slots of the transport pallet into which the forks are inserted and a shape of the forks; an acquisition unit configured to acquire a depth image showing depth information of the fork insertion slots and depth information of the forks in the image; a correction unit configured to correct, using the shape of the fork insertion slots and the shape of the forks that are detected, the depth information so that the shape of the fork insertion slots and the shape of the forks can be recognized in the depth image; and a position estimation unit configured to estimate three-dimensional positions of the fork insertion slots and three-dimensional positions of the forks based on the depth information.

A three-dimensional position estimation method according to the present disclosure, includes: detecting, using an image in which a transport pallet and forks of a forklift for supporting the transport pallet are captured, a shape of fork insertion slots of the transport pallet into which the forks are inserted and a shape of the forks; acquiring a depth image showing depth information of the fork insertion slots and the forks in the image; correcting, using the shape of the fork insertion slots and the shape of the forks that are detected, the depth information so that the shape of the fork insertion slots and the shape of the forks can be recognized in the depth image; and estimating three-dimensional positions of the fork insertion slots and three-dimensional positions of the forks based on the depth information.

A storage medium storing a program according to the present disclosure or the program causes a computer to execute processes of: detecting, using an image in which a transport pallet and forks of a forklift for supporting the transport pallet are captured, a shape of fork insertion slots of the transport pallet into which the forks are inserted and a shape of the forks; acquiring a depth image showing depth information of the fork insertion slots and the forks in the image; correcting, using the shape of the fork insertion slots and the shape of the forks that are detected, the depth information so that the shape of the fork insertion slots and the shape of the forks can be recognized in the depth image; and estimating three-dimensional positions of the fork insertion slots and three-dimensional positions of the forks based on the depth information.

Advantageous Effects of Invention

According to the present disclosure, it is possible to provide an information processing apparatus, a three-dimensional position estimation method, and a program, each adapted to have the forks of a forklift inserted into the fork insertion slots of a transport pallet accurately.

EXAMPLE EMBODIMENT

First Example Embodiment

Hereinbelow, example embodiments of the present disclosure will be described with reference to the drawings. A configuration example of an information processing apparatus 10 according to a first example embodiment will be described with reference to FIG. 1. The information processing apparatus 10 may be a computer device operated by a processor executing a program stored in a memory. Further, the information processing apparatus 10 may be mounted on a forklift, and the traveling, the operations, and the like of the forklift may be controlled by the information processing apparatus 10. Alternatively, the information processing apparatus 10 may perform communication with a computer device installed on a forklift and the traveling, the operations, and the like of the forklift may be controlled in accordance with control messages received from the information processing apparatus 10. In other words, the forklift may be controlled remotely by the information processing apparatus 10. The forklift may operate autonomously and convey transport pallets.

Figure 1:
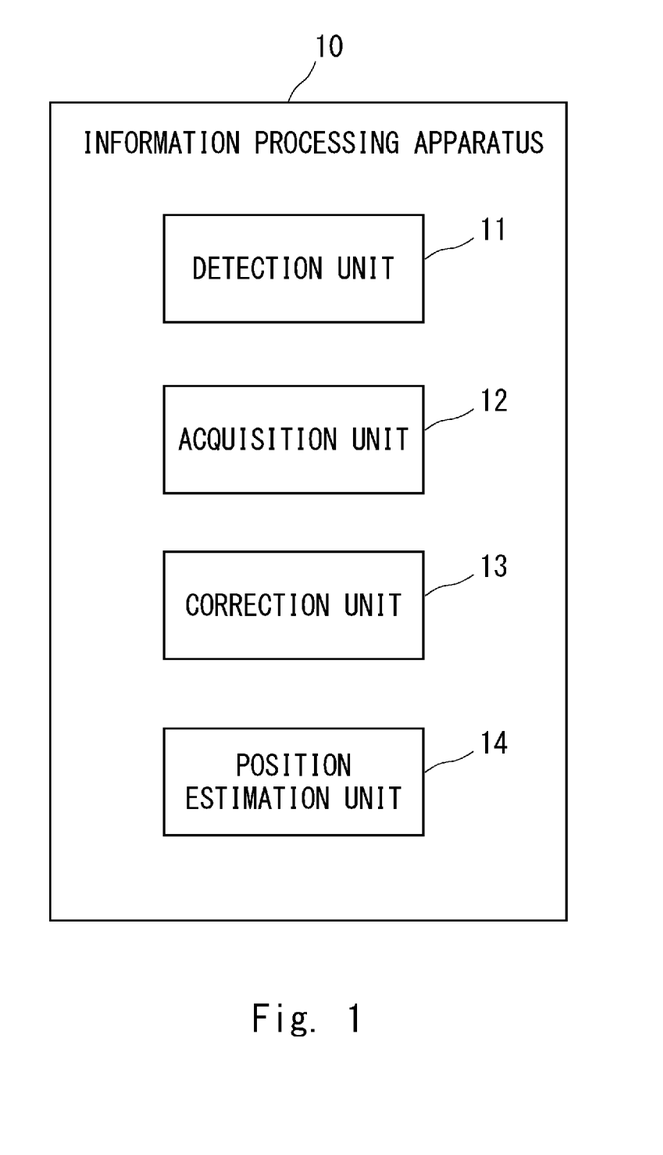
FIG. 1 is a configuration diagram of an information processing apparatus according to a first example embodiment.

The information processing apparatus 10 includes a detection unit 11, an acquisition unit 12, a correction unit 13, and a position estimation unit 14. The components of the information processing apparatus 10 such as the detection unit 11, the acquisition unit 12, the correction unit 13, the position estimation unit 14, and the like may be software or modules in which processing is executed by a processor executing a program stored in a memory. Further, the components of the information processing apparatus 10 may be hardware, such as a chip or a circuit.

The detection unit 11 detects, using an image in which a transport pallet and forks of a forklift for supporting the transport pallet are captured, a shape of the fork insertion slots of the transport pallet into which the forks are inserted and a shape of the forks. An image in which a transport pallet and forks of a forklift are captured may be, for example, an image in which a transport pallet and forks of a forklift are captured in a single image. Alternatively, an image in which a transport pallet and forks of a forklift are captured may be an image in which a transport pallet and forks of a forklift are captured in one frame. Alternatively, an image in which a transport pallet and forks of a forklift are captured may be a video in which a transport pallet and forks of a forklift are shown simultaneously.

The detection unit 11 may detect the shapes of the fork insertion slots of a transport pallet and the forks of a forklift by performing, for example, edge detection. By performing edge detection, the contours of the fork insertion slots of the transport pallet and the forks of the forklift can be shown. Edge detection may also be referred to as feature extraction or the like.

The acquisition unit 12 acquires a depth image showing depth information of the fork insertion slots of a transport pallet and the forks of a forklift in an image in which the transport pallet and the forks are captured. A depth image may also be referred to as a depth map. A depth image may be, for example, an image showing a distance from a camera to an object in the image. A depth map is digital information in which a depth or a distance of an object from the camera in the depth direction of each position within the field of view of an environmental image is expressed by a numerical value. For example, in a depth image, differences in distance can be indicated by changing the colors of objects present at different distances from the camera. The acquisition unit 12 may acquire a depth image generated by a sensor capable of recognizing three-dimensional positions.

The correction unit 13 corrects, using the shape of the fork insertion slots of a transport pallet and the shape of the forks of a forklift detected by the detection unit 11, the depth information so that the shape of the fork insertion slots and the shape of the forks can be recognized in the depth image. When the depth information indicating a distance from the camera to an object contains a noise, the object may not be clearly indicated in the depth image. Specifically, the contours of the object may not be clearly shown in the depth image. In such a case, the correction unit 13 corrects the depth information of the contours that are unclear in the depth image using data on the shapes of the fork insertion slots of a transport pallet and the forks of a forklift detected by the detection unit 11.

The position estimation unit 14 estimates the three-dimensional positions of the fork insertion slots of a transport pallet and the forks of a forklift based on the depth image for which the depth information is corrected by the correction unit 13. The position estimation unit 14 may estimate the three-dimensional positions of the fork insertion slots of a transport pallet and the forks of a forklift by executing a VSLAM (Visual Simultaneous Localization and Mapping) using, for example, an image in which the transport pallet and the forks are captured and a depth image.

As described above, the information processing apparatus 10 can estimate the three-dimensional positions of the fork insertion slots of a transport pallet and the forks of a forklift using the image containing the holes and forks of the transport pallet. Furthermore, the information processing apparatus 10 can use data on the shapes of the fork insertion slots of a transport pallet and the forks of a forklift detected by the detection unit 11 in order to improve the accuracy of the depth image required to estimate the three-dimensional positions of the fork insertion slots of the transport pallet and the forks of the forklift. As a result, since the information processing apparatus 10 can accurately estimate the three-dimensional positions of the fork insertion slots of a transport pallet and the forks of a forklift, the forklift can be controlled so that the forks thereof are accurately inserted into the fork insertion slots of the transport pallet.

Second Example Embodiment

Figure 2:
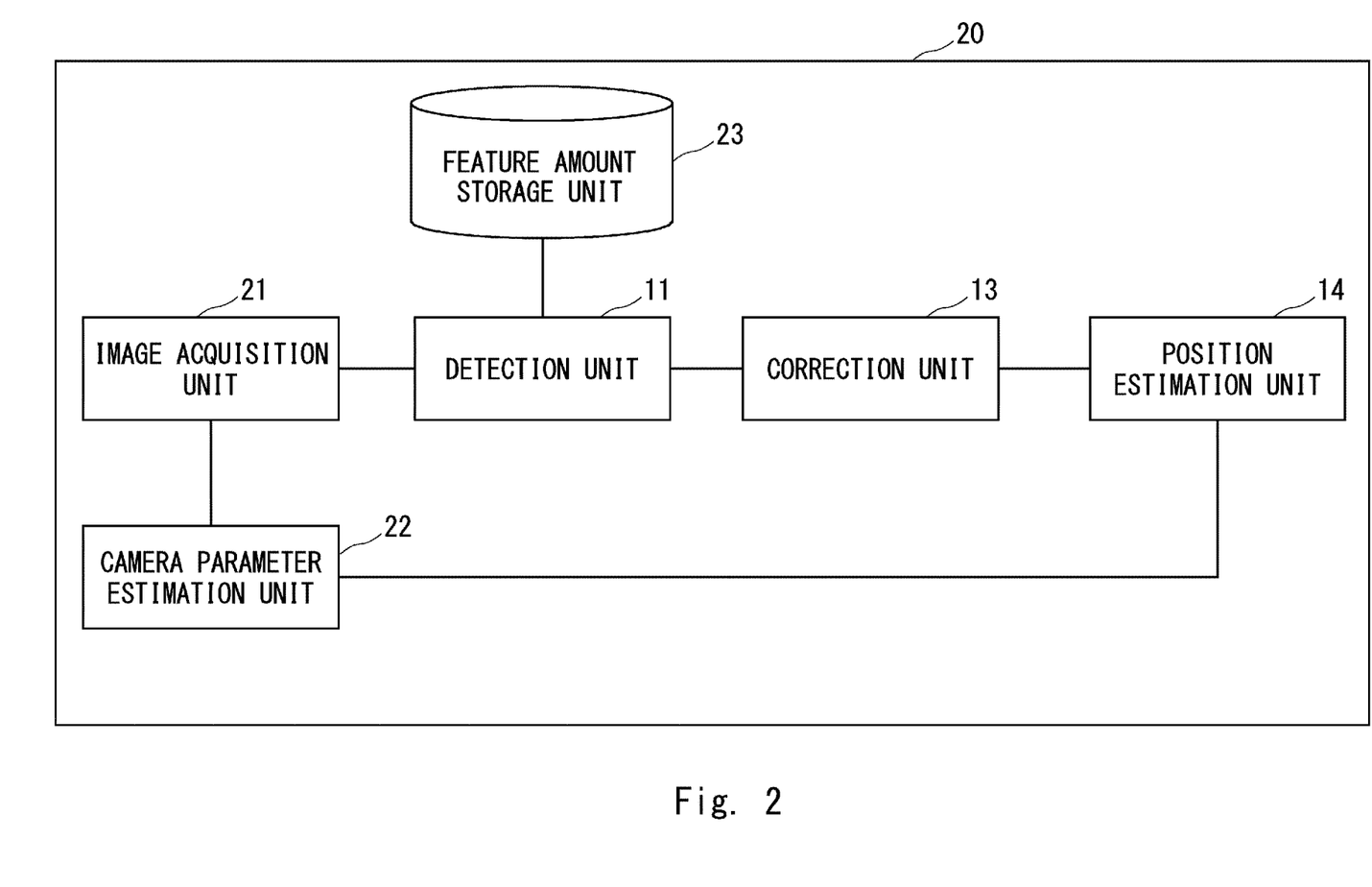
FIG. 2 is a configuration diagram of an information processing apparatus according to a second example embodiment.

Next, a configuration example of an information processing apparatus 20 according to a second example embodiment will be described with reference to FIG. 2. The information processing apparatus 20 includes the detection unit 11, the correction unit 13, the position estimation unit 14, an image acquisition unit 21, a camera parameter estimation unit 22, and a feature amount storage unit 23. The description will be made mainly on the differences of the detection unit 11, the correction unit 13, and the position estimation unit 14 from those described FIG. 1. Components of the information processing apparatus 20, such as the image acquisition unit 21, the camera parameter estimation unit 22, and the feature amount storage unit 23, may be software or modules in which processing is executed by a processor executing a program stored in a memory. Alternatively, components of the information processing apparatus 20 may be hardware, such as a chip or a circuit.

The image acquisition unit 21 corresponds to the acquisition unit 12 in FIG. 1. The image acquisition unit 21 acquires an image used to estimate the three-dimensional positions of the fork insertion slots of a transport pallet and the forks of a forklift. For example, the image acquisition unit 21 may acquire an RGB-D (Red Green Blue and Depth) image in which the fork insertion slots of a transport pallet and the forks of a forklift are included in the same frame. The RGB-D image is an image containing an RGB image and a depth image which are color images. The RGB-D image may be generated, for example, in an RGB-D camera or an RGB-D sensor. An RGB-D camera or an RGB-D sensor is a device equipped with a distance sensor that detects the distance from the camera to an object. In the following, the description of an RGB-D camera applies equally to an RGB-D sensor.

An RGB-D camera may be installed on, for example, a forklift that operates autonomously according to control by the information processing apparatus 20. An RGB-D camera may be installed on a forklift at a position where it can take an image of the tips of the forks of the forklift. That is, the forklift travels to a position where it can take an image of a transport pallet while taking an image of the forks of a forklift using an RGB-D camera. In addition, the forklift travels to a position where it inserts the forks into the fork insertion slots of the transport pallet.

The image acquisition unit 21 may be connected to the RGB-D camera using a cable or the like or may be connected to the RGB-D camera via a wireless communication line. Alternatively, the image acquisition unit 21 may include an RGB-D camera. The image acquisition unit 21 acquires an RGB-D image taken using an RGB-D camera on a real-time basis while the forklift is traveling.

The camera parameter estimation unit 22 estimates the external parameters for the RGB-D camera using an RGB image. Then, the camera parameter estimation unit 22 outputs the estimated external parameters to the position estimation unit 14. The external parameters may be, for example, parameters used in converting coordinates of the world coordinate system into camera coordinates, which are coordinates defined in the camera. The external parameters may be, for example, parameters including a rotation matrix and a position vector. Further, it is assumed that the internal parameters including information about the angle of view of the camera are predetermined. The angle of view generally consists of the number of horizontal pixels, the number of vertical pixels, the focal length between the optical sensor and the lens, etc.

The camera parameter estimation unit 22 recognizes, in the RGB image, a QR (Quick Response) marker affixed to the transport palette. Markers other than QR markers may be affixed to the transport palettes. For example, the camera parameter estimation unit 22 estimates the position and attitude of the QR marker of the transport palette captured in the RGB image. Specifically, the camera parameter estimation unit 22 estimates the two-dimensional coordinates of the QR marker in the RGB image. The camera parameter estimation unit 22 estimates the external parameters for the camera in the world coordinate system using the two-dimensional coordinates of the QR marker. A method of estimating the external parameters for a camera using the two-dimensional coordinates is not limited to a specific method, and may be any commonly used method.

The feature amount storage unit 23 stores the feature amounts of the feature points of the fork insertion slots of a transport pallet and the feature points of the forks of a forklift extracted from an RGB image taken using the RGB-D camera installed on the forklift. The feature points of the fork insertion slots of a transport pallet and the feature points of the forks of a forklift may be, for example, information indicating the contours of the fork insertion slots and the forks of a forklift. Extraction of the feature points of the fork insertion slots of a transport pallet and the feature points of the forks of a forklift may be performed as pre-processing before estimating the three-dimensional positions of the fork insertion slots of the transport pallet and forks of forklift. For example, the detection unit 11 may extract the feature points of the fork insertion slots of a transport pallet and the feature points of the forks of a forklift using the RGB image taken in advance, and the feature amounts of the extracted feature points may be stored in the feature amount storage unit 23. For example, the detection unit 11 may extract the feature points using SIFT, SURF, ORB, AKAZE, or the like. Alternatively, in a device different from the information processing unit 20, the feature points of the fork insertion slots of a transport pallet and the feature points of the forks of a forklift may be extracted using an RGB image that has been taken in advance, and the feature amounts related to the extracted feature points may be stored in the feature amount storage unit 23.

Using the feature points of the fork insertion slots of a transport pallet and the feature points of the forks of a forklift stored in the feature amount storage unit 23 in advance, the detection unit 11 detects the fork insertion slots of a transport pallet and the forks of a forklift captured in an RGB image taken on a real-time basis while the forklift is traveling.

Here, the detection processing of the fork insertion slots of a transport pallet and the forks of a forklift executed by the detection unit 11 will be described in detail. Specifically, edge detection with hysteresis will be described as the detection processing. The detection unit 11 acquires a luminance gradient G and a direction D of the gradient as feature amounts by calculating the first derivative in the X and Y directions of an RGB image expressed in two-dimensional (X-Y) coordinates, which was taken on a real-time basis. Furthermore, the detection unit 11 thins the edge part in the image by performing non-maximum suppression along the direction D of the gradient. The detection unit 11 detects a feature point as an edge when the luminance gradient G of the feature point is equal to or greater than a predetermined threshold.

When a feature point to be an edge is detected in this way, a line of edges is discontinued at the detected edge. In other words, a segment of a continuous line of edges may not be recognized as an edge. This is because, at a point in a segment of a line of edges, the luminance gradient G may show a value below the threshold. In order to prevent such a break-off in the line of edges, the detection unit 11 performs edge detection with hysteresis.

Specifically, when the luminance gradient G at a certain point is less than a threshold value, the detection unit 11 checks the luminance gradient G at points before and after that certain point in the direction D of the gradient. When the luminance gradient G of the points before and after the point where the luminance gradient G is less than a threshold value is greater than or equal to a threshold value and is detected as an edge, the detection unit 11 also detects a point where the luminance gradient G is less than a threshold value as an edge. In this way, the detection unit 11 prevents a line of edges from being discontinued, and detects a continuous line of edges.

Figure 3:
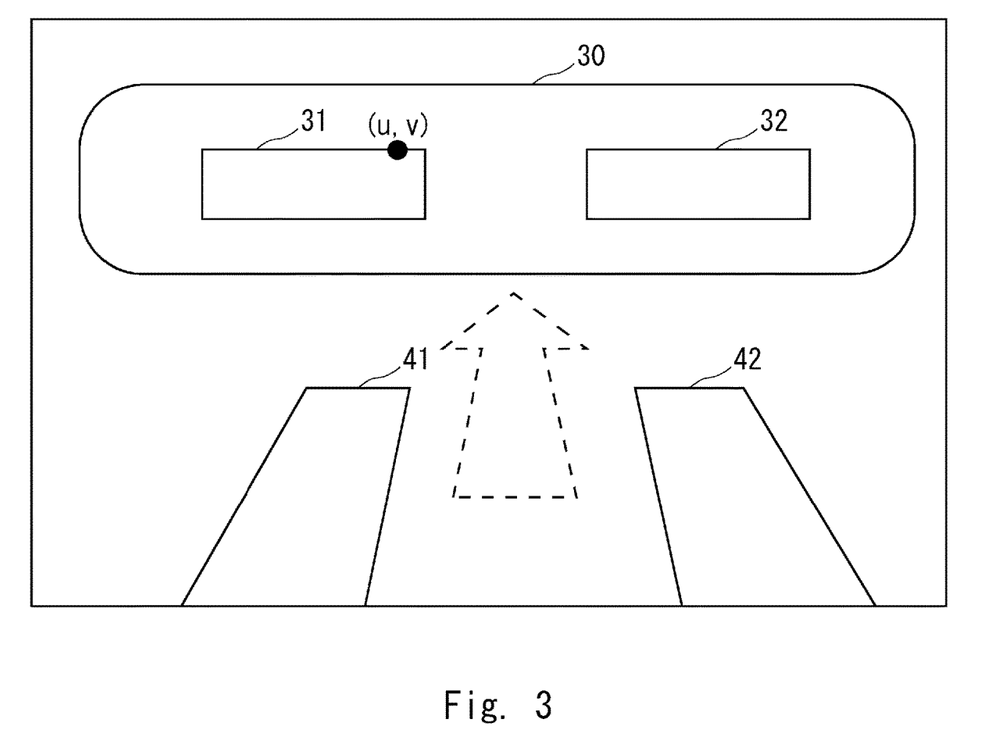
FIG. 3 is a diagram showing a detected pallet according to the second example embodiment.

For example, the fork insertion slots of a transport pallet and the forks of a forklift detected by the detection unit 11 are shown in FIG. 3. FIG. 3 is an image obtained as a result of edge detection with hysteresis performed by the detection unit 11 using one RGB image. FIG. 3 shows that a transport pallet 30 includes fork insertion slots 31 and 32. Furthermore, FIG. 3 shows that forks 41 and 42 are also captured in the image in which the transport pallet 30 is shown. The dashed-line arrow in FIG. 3 indicates the direction in which the forklift is traveling and it is not visible in the actual image. The point detected as an edge by the detection unit 11 is represented by (u, v) using the two-dimensional coordinates, for example.

Figure 4:
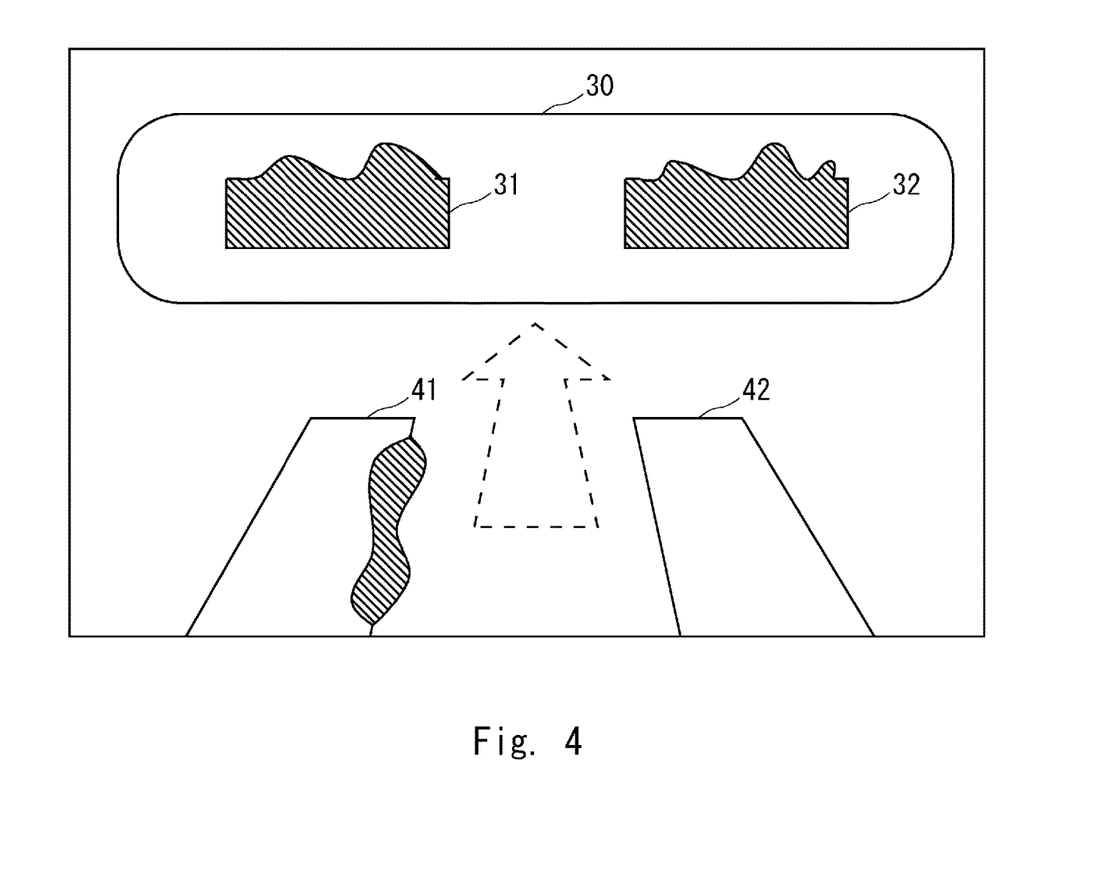
FIG. 4 is a diagram showing a depth image according to the second example embodiment.

The correction unit 13 corrects the depth information of the depth image acquired by the image acquisition unit 21. To be more specific, depth information refers to information indicating the distance from the RGB-D camera to the object. For example, the depth image acquired by the image acquisition unit 21 may be an image like the one shown in FIG. 4. The depth image in FIG. 4 shows a transport pallet 30 including fork insertion slots 31 and 32, and forks 41 and 42, as in FIG. 3. Note the dashed-line arrow in FIG. 4 indicates a direction in which the forklift travels and it is not visible in the actual image. The shaded areas inside the fork insertion slots 31 and 32 show a set of points whose distance from the camera in the depth direction are deep and depth information thereof is unknown. In other words, the shaded areas inside the fork insertion slots 31 and 32 indicate that they are areas where the distance from the RGB-D camera to the object cannot be measured. Further, the shaded areas superimposed on the forks 41 and 42 also show a set of points where the depth information is unknown.

As shown in FIG. 4, in the depth image, when the depth information contains a noise, the boundaries of the fork insertion slots 31 and 32 become unclear compared to the boundaries of the fork insertion slots 31 and 32 in FIG. 3. Similarly, the boundary of the fork 41 becomes unclear compared to the boundary of the fork 41 in FIG. 3. The processing in which the correction unit 13 corrects the depth information of the unclear boundary parts will be described below.

Figure 5:
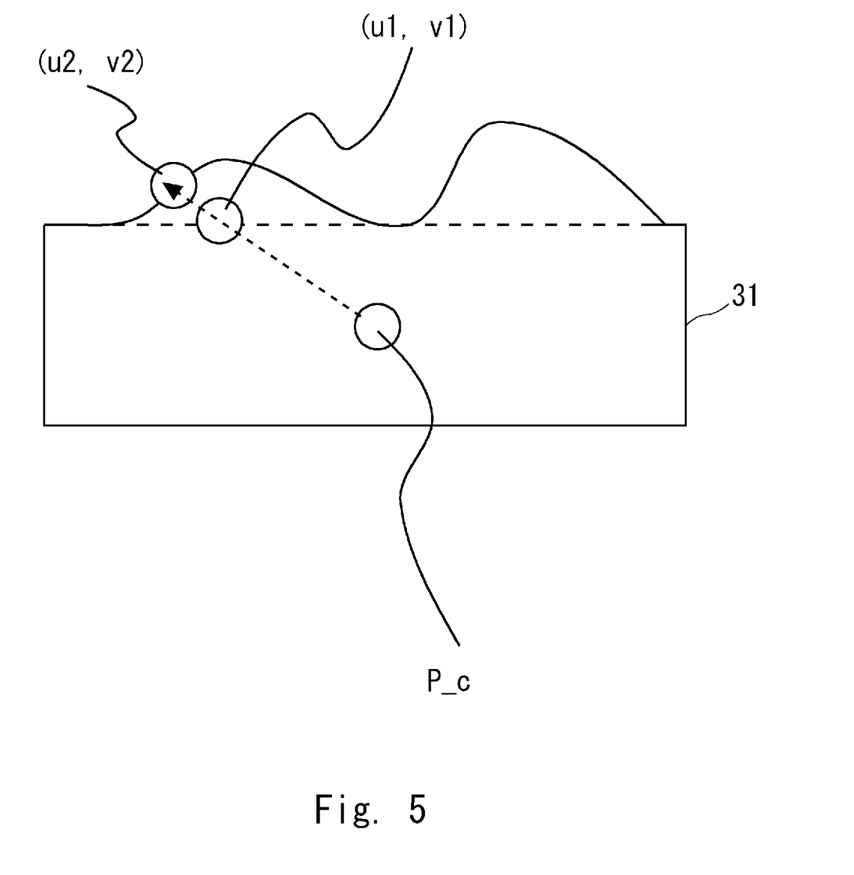
FIG. 5 is a diagram illustrating correction processing of a depth image of a fork insertion slot of a transport pallet according to the second example embodiment.

First, the correction processing in the case where the boundary part of the fork insertion slot 31 is unclear will be described. FIG. 5 shows the fork insertion slot 31 whose boundary part is unclear in the depth image. Furthermore, FIG. 5 shows any arbitrary point (u1, v1) where the depth information is unclear, and a center point P_c of the fork insertion slot 31. Any arbitrary point (u1, v1) whose depth information is unclear indicates a point whose depth information is unknown among the points (u, v) detected as edges of the fork insertion slot 31 in FIG. 3.

The center point P_c may be represented by, for example, coordinates of ((u_max−u_min)/2, (v_max−v_min)/2). u_min represents the x-coordinate indicating the smallest value among the points indicating the edges of the fork insertion slot 31, and u_max represents the x-coordinate indicating the largest value among the points indicating the edges of the fork insertion slot 31. v_min represents the y-coordinate indicating the smallest value among the points indicating the edge of the hole 31, and v_max represents the y-coordinate indicating the largest value among the points indicating the edge of the insertion slot 31. "/" denotes to division (the same shall apply below).

When correcting the depth information of any arbitrary point (u1, v1) whose depth information is unclear, the correction unit 13 estimates the depth information first obtained when exploring for the depth information in the direction of the point (u1, v1) from the center point P_c as the depth information of the point (u1, v1). The dashed-line arrow in FIG. 5 indicates the direction of exploration for the depth information. Specifically, the correction unit 13 corrects the depth information of a point (u2, v2) in FIG. 5 as a value of the depth of information at the point (u1, v1).

Figure 6:
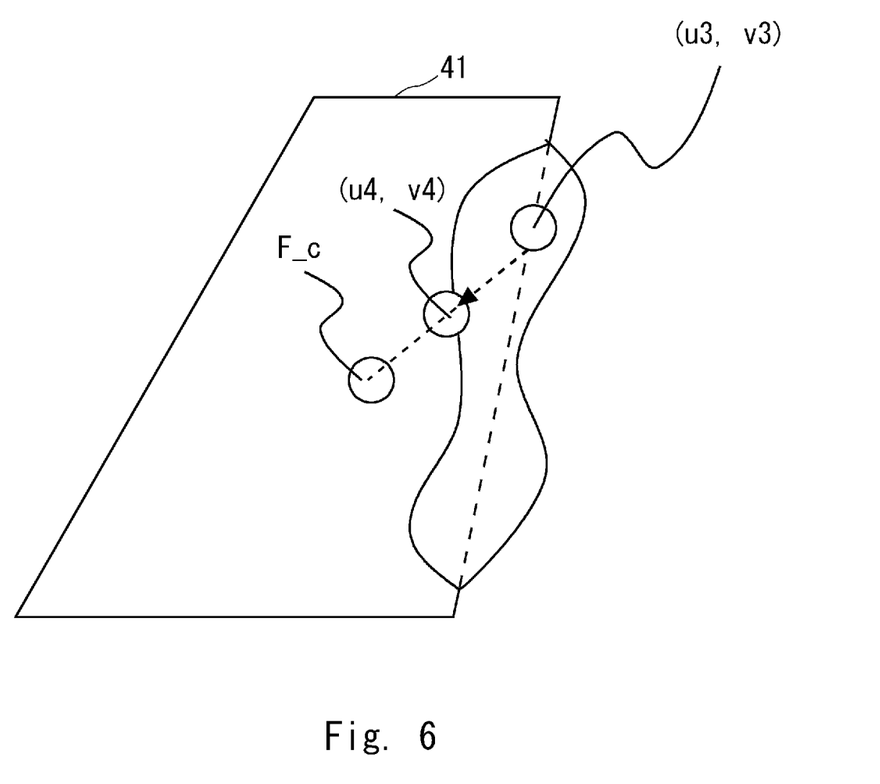
FIG. 6 is a diagram illustrating correction processing of a depth image of a fork according to the second example embodiment.

Next, correction processing when the boundary part of the fork 41 is unknown will be described. FIG. 6 shows the fork 41 whose boundary part is unclear in the depth image. Furthermore, FIG. 6 shows any arbitrary point (u3, v3) where the depth information is unclear, and a center point F_c of the fork 41. Any arbitrary point (u3, v3) whose depth information is unclear indicates a point whose depth information is unknown among the points (u, v) detected as edges of the fork 41 in FIG. 3.

The center point F_c may be represented by, for example, coordinates of ((u_max−u_min)/2, (v_max−v_min)/2). u_min represents the x-coordinate indicating the smallest value among the points indicating the edges of the fork 41, and u_max represents the x-coordinate indicating the largest value among the points indicating the edges of the fork 41. v_min represents the y-coordinate indicating the smallest value among the points indicating the edge of the fork 41, and v_max represents the y-coordinate indicating the largest value among the points indicating an edge of the fork 41.

When correcting the depth information of any arbitrary point (u3, v3) whose depth information is unclear, the correction unit 13 estimates the depth information first obtained when exploring for the depth information in the F_c direction from the point (u3, v3) as the depth information of the point (u3, v3). The dashed-line arrow in FIG. 6 indicates the direction of exploration for the depth information. Specifically, the correction unit 13 corrects the depth information of a point (u4, v4) in FIG. 6 as a value of the depth of information at the point (u3, v3).

In FIG. 5, description has been made of exploring for the depth information in the direction of the point (u1, v1) from the center point P_C, and in FIG. 6, description has been made of exploring for the depth information in the direction of the center point F_c from the point (u3, v3). However, the direction of exploration for the depth information is not limited to those mentioned above, and in FIG. 5, for example, the correction unit 13 may explore for the depth information in the direction of the point (u1, v1) from any point within the area detected as the fork insertion slot 31 in FIG. 3. In FIG. 6, the correction unit 13 may explore for the depth information in the direction of any point within the area detected as the fork 41 in FIG. 3 from the point (u3, v3).

The position estimation unit 14 receives external parameters from the camera parameter estimation unit 22, receives two-dimensional coordinates of the edges of the fork insertion slots of a transport pallet and the edges of the forks of a forklift from the detection unit 11, and further receives depth information of the edges from the correction unit 13. The position estimation unit 14 estimates the three-dimensional positions (three-dimensional coordinates) of the fork insertion slots of a transport pallet and the forks of a forklift using the respective pieces of information received.

The two-dimensional coordinates and the three-dimensional coordinates satisfy the following relation in Equation 1.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{22} & t_z \end{bmatrix} \begin{bmatrix} X_w \\ Y_w \\ Z_w \\ 1 \end{bmatrix} \quad \text{(Equation 1)}$$

s denotes depth information in two-dimensional coordinates (u, v). u and v in the first term on the left side denote the two-dimensional coordinates of the edge detected from the RGB image. The first term on the right side of Equation 1 denotes the internal parameters. The second term on the right side of Equation 1 denotes the external parameters. The third term on the right side of Equation 1 indicates the three-dimensional position of a point (u, v) indicated using two-dimensional coordinates. The internal parameters are assumed to be predetermined based on the camera specifications.

The position estimation unit 14 calculates the three-dimensional positions (three-dimensional coordinates) of the fork insertion slots and forks of the transport pallet by fitting the information received from the camera parameter estimation unit 22, the detection unit 11 and the correction unit 13 to Equation 1.

Figure 7:
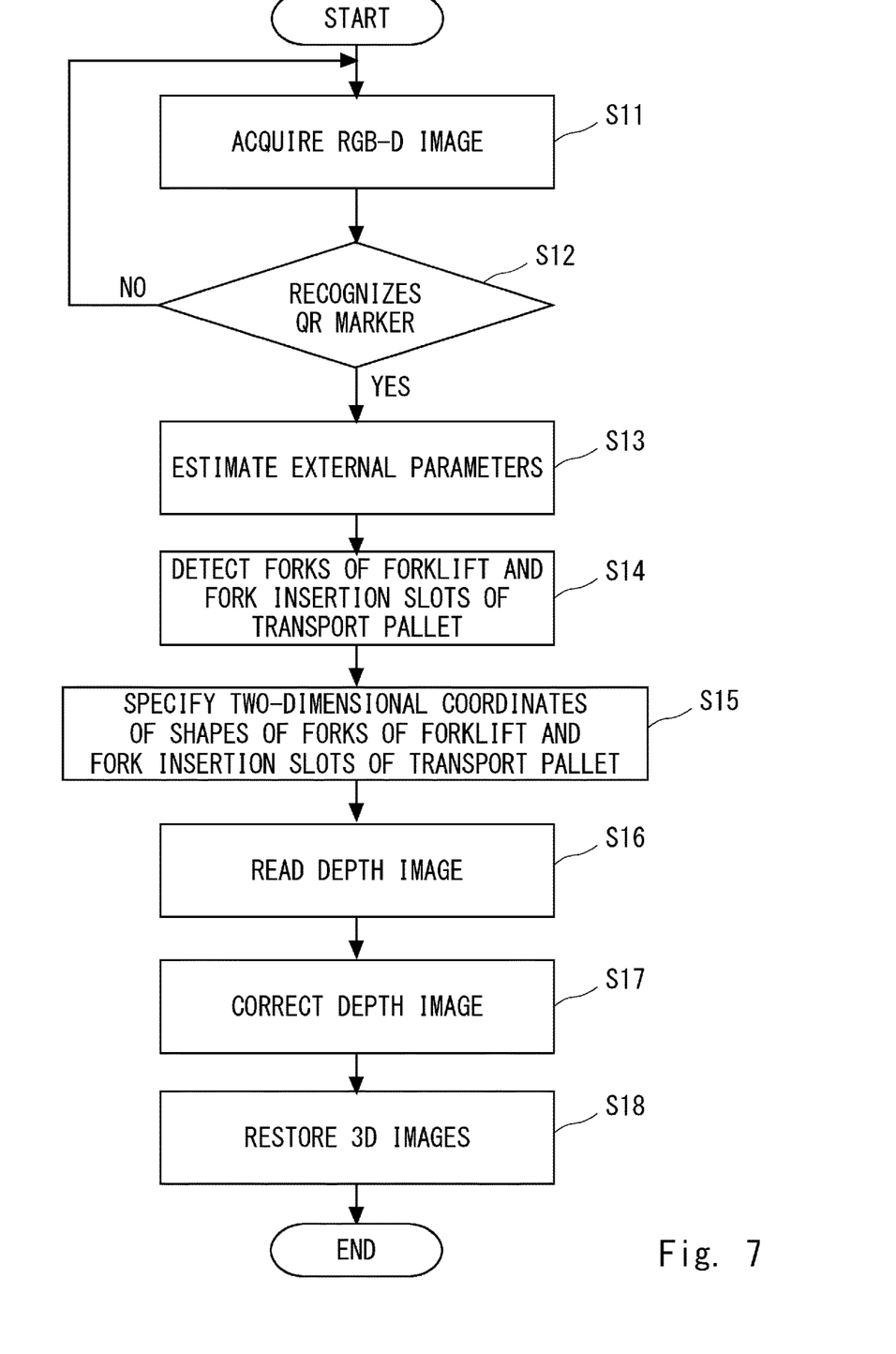
FIG. 7 is a diagram showing a flow of estimation processing of a three-dimensional position according to the second example embodiment.

Next, the flow of 3D image generation processing according to the second example embodiment will be described with reference to FIG. 7. The 3D image is an image in which the three-dimensional positions of feature points are shown. First, the image acquisition unit 21 acquires an RGB-D image (S11). The RGB-D image acquired by the image acquisition unit 21 includes, in the same frame, the fork insertion slots of a transport palette and the forks of a forklift. The RGB-D image is an image containing an RGB image and a depth image which are color images. The image acquisition unit 21 acquires an RGB-D image taken by an RGB-D camera installed on the forklift.

Next, the camera parameter estimation unit 22 determines whether or not a QR marker is captured in the RGB image (S12). It is assumed that a QR (Quick Response) marker affixed to ae transport palette. In other words, if a QR marker in captured in an RGB image, it means that a transportation pallet is captured in the RGB image.

In Step S12, when the camera parameter estimation unit 22 is unable to recognize a QR marker because the QR marker is not captured in the RGB image, the process proceeds to Step S11, and the image acquisition unit 21 acquires another RGB-D image. The other RGB-D images may be RGB-D images taken at different timings from the timing at which the already-acquired RGB-D image was taken.

In Step S12, when the camera parameter estimation unit 22 recognizes a QR marker included in an RGB image, it estimates the external parameters for the camera used for taking the RGB image (S13). Recognizing a QR marker may be rephrased as reading a QR marker.

Next, the detection unit 11 detects the fork insertion slots of a transport pallet and the forks of a forklift captured in the RGB image (S14). Specifically, the detection unit 11 may perform edge detection with hysteresis on the fork insertion slots of a transport pallet and the forks of a forklift. As pre-processing, the detection unit 11 stores, in the feature amount storage unit 23, the feature amounts of the feature points included in the RGB image taken using a camera installed on the forklift. Using the feature amounts of the feature points stored in the feature amount storage unit 23, the detection unit 11 detects the fork insertion slots of a transport pallet and the forks of a forklift from an RGB image taken by the camera on a real-time basis while the forklift is operating autonomously.

Next, the detection unit 11 specifies the two-dimensional coordinates of the shapes of the fork insertion slots of a transport pallet and the forks of a forklift (S15). The two-dimensional coordinates specified by the detection unit 11 are shown as, for example, (u, v).

Next, the correction unit 13 reads the depth image (Depth image) (S16). The depth image refers to an image showing the distance from the camera to the object, and is digital information in which a depth or a distance of an object from the camera in the depth direction of each position within the field angle of the environment image is expressed by a numerical value.

Next, the correction unit 13 corrects the depth information in the depth image (S17). Specifically, the correction unit 13 corrects the depth information in the depth image where the shapes of the fork insertion slots of a transport pallet and the forks of a forklift are unclear. In some cases, the depth information is unknown for the places where the shapes of the fork insertion slots of a transport pallet and the forks of a forklift are unclear. In such cases, the correction unit 13 corrects the depth information of the feature points that is unknown using the depth information of the surrounding feature points.

Next, the position estimation unit 14 estimates the three-dimensional positions of the shapes of the fork insertion slots of a transport pallet and the forks of a forklift using the external parameters for the camera, the two-dimensional coordinates of the shapes of the fork insertion slots of a transport pallet and the forks of a forklift, and the two-depth information of the shapes the fork insertion slots of a transport pallet and the forks of a forklift (S18). That is, the position estimation unit 14 restores or generates 3D images of the fork insertion slots of a transport pallet and the forks of a forklift.

As described above, the information processing apparatus 20 according to the second example embodiment can generate 3D images of the fork insertion slots of a transport pallet and forks of a forklift by using an RGB-D image in which the fork insertion slots of a transport pallet and the forks of a forklift are captured. Thus, since the information processing apparatus 20 can estimate the 3-dimensional positions of the fork insertion slots of a transport pallet and the forklift, the operation of the forklift can be controlled so that the forks of the forklift can be accurately inserted into the fork insertion slots of a transport pallet.

In addition, the information processing apparatus 20 corrects the part of the depth information of the shapes of the fork insertion slots of a transport pallet and the forks of a forklift that is unknown using the depth information of the surrounding feature points. Thus, the information processing apparatus 20 can identify the depth information of the shapes of the fork insertion slots of a transport pallet and the forks of a forklift in the depth image. As a result, the information processing apparatus 20 can accurately generate the 3D images of the shapes of the fork insertion slots of transport pallet and the forks of a forklift.

Figure 8:
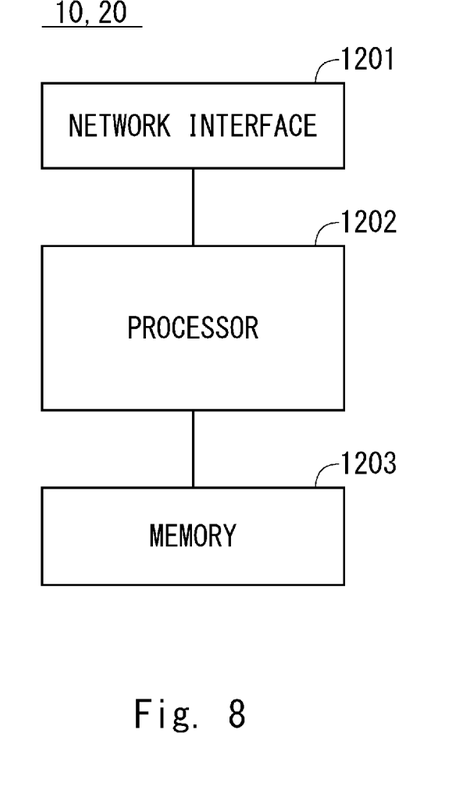
FIG. 8 is a configuration diagram of an information processing apparatus according to each example embodiment.

FIG. 8 is a block diagram showing a configuration example of the information processing device 10 and the information processing device 20 (hereafter referred to as information processing equipment 10, etc.). Referring to FIG. 8, the information processing apparatus 10, etc., includes a network interface 1201, a processor 1202, and a memory 1203. The network interface 1201 may be used to communicate with network nodes (e.g., eNB, MME, P-GW,). The network interface 1201 may include, for example, a network interface card (NIC) that complies with the IEEE 802.3 series. Here, eNB stands for evolved Node B, MME stands for Mobility Management Entity, and P-GW stands for Packet Data Network Gateway. IEEE stands for Institute of Electrical and Electronics Engineers.

The processor 1202 reads and executes software (computer program) from the memory 1203 to perform processing such as a control apparatus 10 described using the flowcharts in the above described embodiments. The processor 1202 may be, for example, a microprocessor, an MPU, or a CPU. The processor 1202 may include a plurality of processors.

The memory 1203 is composed of a combination of a volatile memory and a nonvolatile memory. The memory 1203 may include storage located distant from the processor 1202. In this case, the processor 1202 may access the memory 1203 via an I/O (Input/Output) interface, which is not shown.

In the example of FIG. 8, the memory 1203 is used to store a group of software modules. By reading these software modules from the memory 1203 and executing them, the processor 1202 can have an information processing apparatus 10 perform the processing described in the above example embodiments.

As described using FIG. 8, each of the processors included in the information processor 10 or the like in the above embodiment executes one or more programs including a group of instructions for making the computer perform the algorithm described with reference to the drawings.

In the aforementioned examples, a program can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives), optical magnetic storage media (e.g. magneto-optical disks), CD-ROM (Read Only Memory), CD-R, CD-R/W, DVD (Digital Versatile Disc), semiconductor memories (e.g. mask ROM, PROM (Programmable ROM), EPROM (Erasable PROM), flash ROM, and RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

The present disclosure is not to be limited to the above-described example embodiments, and can be appropriately changed without departing from the gist of the present disclosure.

The whole or part of the example embodiments disclosed above can be described as, but not limited to, the following supplementary notes.

(Supplementary Note 1)
An information processing apparatus comprising:
a detection unit configured to detect, using an image in which a transport pallet and forks of a forklift for supporting the transport pallet are captured, a shape of fork insertion slots of the transport pallet into which the forks are inserted and a shape of the forks;
an acquisition unit configured to acquire a depth image showing depth information of the fork insertion slots and depth information of the forks in the image;
a correction unit configured to correct, using the shape of the fork insertion slots and the shape of the forks detected by the detection unit, the depth information so that the shape of the fork insertion slots and the shape of the forks can be recognized in the depth image; and
a position estimation unit configured to estimate three-dimensional positions of the fork insertion slots and three-dimensional positions of the forks based on the depth information.

(Supplementary Note 2)
The information processing apparatus described in Supplementary Note 1, wherein, in the case where measurement for depth information at positions representing the shape of the fork insertion slots and the shape of the forks is not performed, the correction unit estimates the depth information at the positions using depth information in the periphery of the positions.

(Supplementary Note 3)
The information processing apparatus described in Supplementary Note 2, wherein, in the case where measurement for the depth information at positions representing the shape of the fork insertion slots is not performed, the correction unit explores for depth information in an outward direction of the fork insertion slots from an arbitrary position inside the insertion slots and estimates, using the obtained depth information, depth information at positions where depth information has not been measured.

(Supplementary Note 4)
The information processing apparatus described in Supplementary Note 2 or 3, wherein, in the case where measurement for the depth information at positions representing the shape of the forks is not performed, the correction unit explores for depth information in an inward direction of the forks from the positions where the depth information has not been measured and estimates, using the obtained depth information, the depth information at positions where depth information have not been measured.

(Supplementary Note 5)
The information processing apparatus described in any one of Supplementary Notes 1 to 4, wherein the detection unit detects the shape of the fork insertion slots of the transport pallet and the shape of the forks of the forklift by comparing feature points extracted from a peripheral image taken in advance using a camera that took the image and feature points extracted from the image.

(Supplementary Note 6)
The information processing apparatus described in Supplementary Note 5, wherein the detection unit detects the shape of the fork insertion slots and the shape of the forks by performing edge detection with hysteresis.

(Supplementary Note 7)
The information processing apparatus described in any one of Supplementary Notes 1 to 5, wherein
the detection unit specifies the two dimensional coordinates of a plurality of feature points representing the shape of the fork insertion slots of the transportation pallet and the shape of the forks of the forklift, and
the correction unit corrects depth information of the feature points whose depth information is unknown among the plurality of the feature points.

(Supplementary Note 8)
The information processing apparatus described in any one of Supplementary Notes 1 to 7, further comprising a camera parameter estimation unit configured to detect a marker affixed to the transport pallet in the image and estimate external parameters for the camera that took the image, wherein the position estimation unit estimates the three-dimensional positions of the fork insertion slots and the forks based on the depth information and the external parameters.

(Supplementary Note 9)
The information processing apparatus described in Supplementary Notes 1 to 7, wherein the depth image is contained in an RGB-D image taken using an RGB-D camera.

(Supplementary Note 10)

A three-dimensional position estimation method performed by an information processing apparatus, the method comprising:

detecting, using an image in which a transport pallet and forks of a forklift for supporting the transport pallet are captured, a shape of fork insertion slots of the transport pallet into which the forks are inserted and a shape of the forks;

acquiring a depth image showing depth information of the fork insertion slots and the forks in the image;

correcting, using the shape of the fork insertion slots and the shape of the forks that are detected, the depth information so that the shape of the fork insertion slots and the shape of the forks can be recognized in the depth image; and estimating three-dimensional positions of the fork insertion slots and three-dimensional positions of the forks based on the depth information.

(Supplementary Note 11)

A program for causing a computer to execute processes of:

detecting, using an image in which a transport pallet and forks of a forklift for supporting the transport pallet are captured, a shape of fork insertion slots of the transport pallet into which the forks are inserted and a shape of the forks;

acquiring a depth image showing depth information of the fork insertion slots and the forks in the image;

correcting, using the shape of the fork insertion slots and the shape of the forks that are detected, the depth information so that the shape of the fork insertion slots and the shape of the forks can be recognized in the depth image; and estimating three-dimensional positions of the fork insertion slots and three-dimensional positions of the forks based on the depth information.

REFERENCE SIGNS LIST

10 INFORMATION PROCESSING APPARATUS
11 DETECTION UNIT
12 ACQUISITION UNIT
13 CORRECTION UNIT
14 POSITION ESTIMATION UNIT
20 INFORMATION PROCESSING APPARATUS
21 IMAGE ACQUISITION UNIT
22 CAMERA PARAMETER ESTIMATION UNIT
23 FEATURE AMOUNT STORAGE UNIT
30 TRANSPORT PALLET
31 FORK INSERTION SLOT
32 FORK INSERTION SLOT
41 FORK
42 FORK

What is claimed is:

1. An information processing apparatus comprising:
at least one memory storing instructions; and
at least one processor configured to execute the instructions to:
detect, using an image in which a transport pallet and forks of a forklift for supporting the transport pallet are captured, a shape of fork insertion slots of the transport pallet into which the forks are inserted and a shape of the forks;
acquire a depth image showing depth information of the fork insertion slots and depth information of the forks in the image;
correct, using the shape of the fork insertion slots and the shape of the forks that are detected, the depth information so that the shape of the fork insertion slots and the shape of the forks can be recognized in the depth image; and
estimate three-dimensional positions of the fork insertion slots and three-dimensional positions of the forks based on the depth information,
wherein, in the case where measurement for depth information at positions representing the shape of the fork insertion slots and the shape of the forks in the depth image is not performed, the at least one processor is further configured to execute the instructions to estimate the depth information at the positions using depth information in the periphery of the positions, and
wherein, in the case where measurement for the depth information at positions representing the shape of the fork insertion slots is not performed, the at least one processor is further configured to execute the instructions to explore for depth information in an outward direction of the fork insertion slots from an arbitrary position inside the insertion slots and estimate, using the obtained depth information, depth information at positions where depth information has not been measured.

2. The information processing apparatus according to claim 1, wherein, in the case where measurement for the depth information at positions representing the shape of the forks is not performed, the at least one processor is further configured to execute the instructions to explore for depth information in an inward direction of the forks of the forklift from the positions where the depth information has not been measured and estimate, using the obtained depth information, the depth information at positions where depth information have not been measured.

3. The information processing apparatus according to claim 1, wherein the at least one processor is further configured to execute the instructions to detect the shape of the fork insertion slots of the transport pallet and the shape of the forks of the forklift by comparing feature points extracted from a peripheral image taken in advance using a camera that took the image and feature points extracted from the image.

4. The information processing apparatus according to claim 3, wherein the at least one processor is further configured to execute the instructions to detect the shape of the fork insertion slots and the shape of the forks by performing edge detection with hysteresis.

5. The information processing apparatus according to claim 1, wherein the at least one processor is further configured to execute the instructions to:
specify the two dimensional coordinates of a plurality of feature points representing the shape of the fork insertion slots of the transportation pallet and the shape of the forks; and
correct depth information of the feature points whose depth information is unknown among the plurality of the feature points.

6. The information processing apparatus according to claim 1, the at least one processor is further configured to execute the instructions to:
detect a marker affixed to the transport pallet in the image and estimate external parameters for the camera that took the image; and estimate the three-dimensional positions of the fork insertion slots and the forks based on the depth information and the external parameters.

7. The information processing apparatus according to claim 1, wherein the depth image is contained in an RGB-D image taken using an RGB-D camera.

8. A three-dimensional position estimation method performed by an information processing apparatus, the method comprising:

detecting, using an image in which a transport pallet and forks of a forklift for supporting the transport pallet are captured, a shape of fork insertion slots of the transport pallet into which the forks are inserted and a shape of the forks;

acquiring a depth image showing depth information of the fork insertion slots and the forks in the image;

correcting, using the shape of the fork insertion slots and the shape of the forks that are detected, the depth information so that the shape of the fork insertion slots and the shape of the forks can be recognized in the depth image;

estimating three-dimensional positions of the fork insertion slots and three-dimensional positions of the forks based on the depth information;

in the case where measurement for depth information at positions representing the shape of the fork insertion slots and the shape of the forks in the depth image is not performed, estimating the depth information at the positions using depth information in the periphery of the positions; and in the case where measurement for the depth information at positions representing the shape of the fork insertion slots is not performed, exploring for depth information in an outward direction of the fork insertion slots from an arbitrary position inside the insertion slots and estimating, using the obtained depth information, depth information at positions where depth information has not been measured.

9. A non-transitory computer readable-medium storing a program for causing a computer to execute operations comprising:

detecting, using an image in which a transport pallet and forks of a forklift for supporting the transport pallet are captured, a shape of fork insertion slots of the transport pallet into which the forks are inserted and a shape of the forks;

acquiring a depth image showing depth information of the fork insertion slots and the forks in the image;

correcting, using the shape of the fork insertion slots and the shape of the forks that are detected, the depth information so that the shape of the fork insertion slots and the shape of the forks can be recognized in the depth image; and estimating three-dimensional positions of the fork insertion slots and three-dimensional positions of the forks based on the depth information;

in the case where measurement for depth information at positions representing the shape of the fork insertion slots and the shape of the forks in the depth image is not performed, estimating the depth information at the positions using depth information in the periphery of the positions; and in the case where measurement for the depth information at positions representing the shape of the fork insertion slots is not performed, exploring for depth information in an outward direction of the fork insertion slots from an arbitrary position inside the insertion slots and estimating, using the obtained depth information, depth information at positions where depth information has not been measured.

* * * * *